(12) United States Patent
Klucsarits et al.

(10) Patent No.: US 11,214,276 B2
(45) Date of Patent: Jan. 4, 2022

(54) OPERATING METHOD FOR AN EMERGENCY VEHICLE

(71) Applicant: Rosenbauer International AG, Leonding (AT)

(72) Inventors: Anton Klucsarits, Kleinzell (AT); Edmund Penz, Linz (AT); Alexander Ronacher, Hoersching (AT); Stefan Zauner, St. Martin (AT)

(73) Assignee: Rosenbauer International AG, Leonding (AT)

( * ) Notice: Subject to any disclaimer, the term of this patent is extended or adjusted under 35 U.S.C. 154(b) by 168 days.

(21) Appl. No.: 16/331,689

(22) PCT Filed: Sep. 8, 2017

(86) PCT No.: PCT/AT2017/060218
§ 371 (c)(1),
(2) Date: Mar. 8, 2019

(87) PCT Pub. No.: WO2018/049443
PCT Pub. Date: Mar. 22, 2018

(65) Prior Publication Data
US 2019/0202469 A1    Jul. 4, 2019

(30) Foreign Application Priority Data
Sep. 13, 2016  (AT) ................ A 50812/2016

(51) Int. Cl.
*B60W 30/182*    (2020.01)
*B60W 50/08*     (2020.01)
(Continued)

(52) U.S. Cl.
CPC ........... *B60W 50/082* (2013.01); *A62C 27/00* (2013.01); *A62C 37/00* (2013.01); *B60W 10/06* (2013.01);
(Continued)

(58) Field of Classification Search
CPC ........ A62C 27/00; A62C 37/00; B60W 10/06; B60W 10/10; B60W 10/22;
(Continued)

(56) References Cited

U.S. PATENT DOCUMENTS 5,736,925 A    4/1998  Knauff et al.
6,879,898 B2 * 4/2005  Ghoneim ........... B60G 17/0195
                                                180/65.6
(Continued)

FOREIGN PATENT DOCUMENTS

CN    201703330 U    1/2011
CN    104648383 A    5/2015
(Continued)

OTHER PUBLICATIONS

International Search Report in PCT/AT2017/060218, dated Feb. 9, 2018.

*Primary Examiner* — Hunter B Lonsberry
*Assistant Examiner* — Matthew J. Reda
(74) *Attorney, Agent, or Firm* — Collard & Roe, P.C.

(57) ABSTRACT

In an operating method for an emergency vehicle, especially a fire truck, having a vehicle body, a drive unit having a drive motor and a motor controller, front-wheel and rear-wheel pairs, an emergency aggregate, a signaling device, an illuminating device, and a mode-of-operation controller having a mode-of-operation selector switch having selectable operation modes and a memory with saved operating-data sets, by a sequence controller of the mode-of-operation controller, selecting a first operation mode corresponding to an emergency trip transmits from the memory to the target systems, and activates, first operating-data data sets. Selecting a second operation mode corresponding to an emergency mode deactivates the transmitted first operation mode operating-data sets, and transmits from the memory to the target systems, and activates, second operating-data sets. Selecting
(Continued)

a third operation mode corresponding to a standard operation mode deactivates the transmitted data sets of the first, second or any further operation modes.

21 Claims, 2 Drawing Sheets

(51) Int. Cl.
*B60W 10/06* (2006.01)
*B60W 10/10* (2012.01)
*B60W 10/22* (2006.01)
*B60W 30/18* (2012.01)
*B60W 50/00* (2006.01)
*A62C 27/00* (2006.01)
*A62C 37/00* (2006.01)

(52) U.S. Cl.
CPC ............ *B60W 10/10* (2013.01); *B60W 10/22* (2013.01); *B60W 30/18* (2013.01); *B60W 30/18054* (2013.01); *B60W 50/0098* (2013.01); *B60W 50/085* (2013.01); *B60W 2050/0063* (2013.01); *B60W 2540/18* (2013.01); *B60W 2552/30* (2020.02); *B60W 2556/45* (2020.02); *B60W 2556/50* (2020.02); *B60W 2710/06* (2013.01); *B60W 2710/10* (2013.01); *B60W 2710/22* (2013.01)

(58) Field of Classification Search
CPC ..... B60W 2050/0063; B60W 2540/18; B60W 2710/06; B60W 2710/10; B60W 2710/22; B60W 30/18; B60W 30/18054; B60W 50/0098; B60W 50/082; B60W 50/085; B60W 2550/146; B60W 2550/40; B60W 2550/402; B60W 2552/30; B60W 2556/45; B60W 2556/50
See application file for complete search history.

(56) References Cited

U.S. PATENT DOCUMENTS

| | | | |
|---|---|---|---|
| 7,107,129 B2 | 9/2006 | Rowe et al. | |
| 7,127,331 B2 | 10/2006 | Pillar et al. | |
| 7,349,776 B2 | 3/2008 | Spillane et al. | |
| 9,475,496 B2 | 10/2016 | Attard et al. | |
| 10,184,559 B2 | 1/2019 | Pfeifer et al. | |
| 2002/0103580 A1 | 8/2002 | Yakes et al. | |
| 2003/0085576 A1* | 5/2003 | Kuang | B60L 50/16 290/40 C |
| 2003/0158638 A1* | 8/2003 | Yakes | G01M 17/00 701/22 |
| 2003/0200016 A1* | 10/2003 | Spillane | B60W 10/11 701/36 |
| 2004/0002794 A1* | 1/2004 | Pillar | G07C 5/08 701/1 |
| 2004/0199302 A1 | 10/2004 | Pillar et al. | |
| 2005/0224236 A1* | 10/2005 | Cano | A62C 27/00 169/24 |
| 2007/0142166 A1* | 6/2007 | Gebby | B60W 30/188 477/15 |
| 2007/0185625 A1 | 8/2007 | Pillar et al. | |
| 2010/0010793 A1* | 1/2010 | Herman | G08G 5/006 703/8 |
| 2013/0240080 A1 | 9/2013 | Pick et al. | |
| 2016/0252177 A1 | 9/2016 | Pfeifer et al. | |

FOREIGN PATENT DOCUMENTS

| | | |
|---|---|---|
| CN | 105599758 A | 5/2016 |
| DE | 195 15 255 A1 | 10/1996 |
| DE | 101 62 866 A1 | 7/2003 |
| DE | 10 2013 222 203 A1 | 4/2015 |
| DE | 10 2015 003 590 A1 | 10/2015 |
| EP | 1 355 209 A1 | 10/2003 |
| EP | 1 424 103 A2 | 6/2004 |
| JP | 2009035143 A | 2/2009 |
| JP | 2013005932 A | 1/2013 |
| WO | 03/055714 A1 | 7/2003 |
| WO | 2008/083775 A2 | 7/2008 |
| WO | 2015/062794 A3 | 9/2015 |

* cited by examiner

OPERATING METHOD FOR AN EMERGENCY VEHICLE

CROSS REFERENCE TO RELATED APPLICATIONS

This application is the National Stage of PCT/AT2017/060218 filed on Sep. 8, 2017, which claims priority under 35 U.S.C. §119 of Austrian Application No. A 50812/2016 filed on Sep. 13, 2016, the disclosure of which is incorporated by reference. The international application under PCT article 21(2) was not published in English.

The invention relates to an operating method for an emergency vehicle, especially for a fire truck.

In greatly simplified terms, at least two main modes of operation can be defined for emergency vehicles. One is the accustomed driving operation, in which the emergency vehicle is moving on public and also private roadways. Here, the emergency vehicle, with respect to the driving dynamic, especially the desired driving speed, is moving within the generally valid framework conditions in accordance with the highway traffic regulation. This also includes, for example, the return trip from an emergency.

In contrast to this, a second mode of operation exists, in which the emergency vehicle is responding to an emergency and wherein the emergency site is to be reached as rapidly as possible and then, upon arrival at the emergency site, emergency readiness is to be established as rapidly as possible. For this purpose, it is necessary that the emergency vehicle approach the emergency site as rapidly as possible and that the emergency speed be reached as rapidly as possible after stopping or traveling slowly. In the case of a fire truck, especially one transporting extinguishing agent, usually the water tank is also filled during an emergency trip, and so the emergency vehicle is correspondingly heavy and the center of gravity of the emergency vehicle will be quite high. A fire truck may also be outfitted, for example, with a turntable ladder, thus usually resulting in a particular vehicle length and likewise a high center of gravity. High center of gravity and/or vehicle length or weight act negatively on the driving dynamic, wherein the high center of gravity in particular may lead to instability during high-speed cornering or to load shifting.

During the approach to and also upon arrival at the emergency site, several actions are to be performed as rapidly as possible by the driver of the emergency vehicle, albeit in a usually predetermined sequence, in order to establish emergency readiness. For the driver of the emergency vehicle, this large number of activities that he or she has to perform besides the actual steering of the emergency vehicle leads to considerable tenseness, which may lead, in addition to the tenseness caused by the emergency trip, to considerable stress. The emergency driver must deal with a navigation system, a driving dynamic system, an emergency control system, an extinguishing-agent supply system or a system for technical emergencies, an emergency-site illuminating system and the like. In the emergency situation, it may now happen as a result of stress that the driver is severely distracted by the diverse secondary tasks, which may lead to a hazard for the emergency crew traveling along in the emergency vehicle or to other road users. Furthermore, the configuration requirements may delay the trip to the emergency site or the emergency readiness at the emergency site.

From the prior art, individual isolated systems are now known that take over completed sub-tasks. For example, DE 10 2015 003 590 A1 discloses a method and a system for level regulation in a vehicle. Therein the alignment of the vehicle is determined and level-regulating elements are activated, in order to keep the alignment of a vehicle in a defined relationship with the roadway.

WO 08/083775 A2 also discloses a similar system, with which the alignment of a vehicle may be changed with respect to the ground level.

As regards an adjustable vehicle dynamic, WO 15/062794 A3, for example, describes a gearbox with various speeds for various driving programs.

From WO 03/055714 A1, a control system for an electric vehicle is known that has a communications network and wherein, furthermore, the electric drive motors are connected to the communications network.

Furthermore, systems for emergency vehicles are known from the prior art that assist an engineer of an extinguishing-agent-transporting fire truck in operating the extinguishing system.

However, all already known systems are closed units and as such are oriented toward quite specifically making the respective functionality available. It is further incumbent upon the driver of an emergency vehicle to deal with the correct parameterization and activation of the individual systems, which reduces an existing stress level not at all or only negligibly. From the prior art, no system is known that assists an emergency driver or an emergency captain traveling along in the configuration steps, which in some cases are complex and time-critical, or that performs these automatically as much as possible.

As individual solutions, the systems and methods known from the prior art are usually optimized to the effect of providing the respectively desired or required functionality as well as possible. An assistance of the emergency driver in terms of the necessary configuration actions for the various types of operation of an emergency vehicle is not known from the prior art.

The task of the invention now lies in creating a method that in particular assists a driver of an emergency vehicle to the effect that he or she is able to concentrate fully and completely on the steering of the emergency vehicle without being distracted by an emergency configuration.

This task is accomplished by an operating method for an emergency vehicle, especially for a fire truck. The emergency vehicle has a vehicle body, a drive unit having at least one drive motor and one motor control unit, at least one front-wheel pair and at least one rear-wheel pair and at least one emergency aggregate as well as a signaling and illuminating device. The front-wheel pair and the rear-wheel pair are respectively joined via a suspension mechanism having a level-regulating system to the vehicle body, and furthermore the at least rear-wheel pair is in communication with the drive motor. The emergency aggregate is in communication with the drive motor or it has an aggregate drive motor. Furthermore, the emergency vehicle comprises a mode-of-operation controller, which has a mode-of-operation selector switch having several selectable modes of operation and a memory means having operating-data sets saved therein. Operating-data sets means all those data sets which comprise specific configuration parameters for a mode of operation for respectively one module of the emergency vehicle.

By a sequence controller of the mode-of-operation controller, upon selection of a first mode of operation, which corresponds to an emergency trip, a first motor-control data set is transmitted from the memory means to the motor controller, and a first suspension-control data set is transmitted from the memory means to the suspension mechanism, and a first signaling data set is transmitted from the memory means to the signaling and illuminating device. Thereupon the transmitted data sets are activated.

Upon selection of a second mode of operation, which corresponds to an emergency mode, the transmitted data sets of the first mode of operation are deactivated and a second motor-control data set is transmitted from the memory means to the motor controller, a second suspension-control data set is transmitted from the memory means to the suspension mechanism, and a second signaling data set is transmitted from the memory means to the signaling and illuminating device, and a first emergency-aggregate data set is transmitted to the emergency aggregate. Thereupon the transmitted data sets are activated.

Upon selection of a third mode of operation, which corresponds to a standard mode of operation, the transmitted data sets of the first, second or if applicable further modes of operation are deactivated.

Due to these conformations, it is ensured that preparatory or necessary adjustment tasks concerning the operating behavior of the emergency vehicle during an emergency are carried out automatically, completely and in the correct sequence according to selection of the mode of operation, for example by the driver. Thereafter matters are simplified for the driver, wherein an emergency captain traveling along or another emergency responder in the emergency vehicle is also able to make the selection of mode of operation.

In the first mode of operation, arrival at the emergency site is achieved as rapidly as possible. Here the emergency vehicle must be designed for maximum power. The emergency vehicle may be, for example, an extinguishing-agent-transporting fire truck, which has a full tank during the emergency trip and thus is correspondingly heavy during transit. Accordingly, a high power is demanded from the drive motor, in order that it can always re-accelerate the vehicle rapidly. Since cornering maneuvers are usually always necessary on the emergency route, the suspension of the wheels, especially the damping, must be adjusted to the high-speed cornering with a high vehicle center of gravity, in order to minimize a hazardous lateral tilting. A loss of driving comfort or an operation of the drive motor in the limit-load range is tolerated here.

In the second mode of operation, upon arrival at the emergency site or on the emergency site, it is necessary to ensure emergency readiness of the vehicle or of the crew transported on it as rapidly as possible. For this purpose, a large number of adjustments is often necessary. Due to the advantageous embodiment, it is now ensured that no step is overlooked in the hectic situation that always exists even for emergency responders experience in the routine and that, in addition, emergency readiness is established more rapidly.

After the end of the emergency, it is of advantage when it is ensured that, in the third mode of operation, all adjustments that had been made are reset to normal operation.

In the first mode of operation or the emergency mode, all those sequences and actions are included that are necessary for the emergency vehicle to reach the support point at the emergency site as rapidly as possible. An important part of this will concern the trip. The trip may comprise, for example, highway stretches, inner city streets, rural roads, mountain roads and/or poorly paved or unpaved paths. For all routes, it is necessary to travel as rapidly and safely with respect to traffic as possible. With regard to the operating-data sets, this means that the parameters of the operating-data sets for a trip over a highway portion will differ significantly from those when the emergency vehicle is traveling on a poorly paved mountain road.

The second mode of operation is understood as the emergency mode at the emergency site. Here it is naturally of very great importance whether firefighting with water is involved or whether a fire in an industrial establishment is to be extinguished with special extinguishing agents. Also, the operating-data sets will be parameterized with different operating-data sets when the emergency occurs in winter. Even during technical emergencies, differences in the parameterization of the operating-data sets will occur that are matched to the respective emergency situation.

According to a further development, it is provided that the rear-wheel pair is in communication with the drive motor via a gearbox and that, in the first mode of operation, a first gearbox-control data set is transmitted from the memory means to the gearbox. In modern heavy trucks or emergency vehicles, automatic transmissions are very widely used in order to achieve a good adaptation of the drive motor to the tire set. Gearbox controllers are now designed in such a way that gearshifts take place in the optimum power or torque range of the drive motor. However, since speed is a concern during the emergency trip, the shift characteristic of the gearbox for the first mode of operation is parameterized in such a way that shifting takes place as late as possible, in order to be able to utilize the motor power of the drive motor at high rpm values.

A further development also consists in that, in the first motor-control data sets, parameters of the motor controller are saved in order to change the performance characteristics of the drive motor in such a way that it is configured to deliver maximum peak power. In an internal combustion engine, the power or torque performance characteristics are influenced by parameters such as injection timing, boost pressure, possibly the ignition timing, etc. among others. In the case of an electric motor, the exciter field primarily determines the motor characteristic. During an emergency trip, it may be provided that the drive motor is operated in an operating range that is disadvantageous in terms of fuel or energy consumption as well as wear but that is tolerated in favor of the higher power and thus an earlier arrival at the emergency site.

According to a further development, it is provided that, in the second motor-control data sets, parameters of the motor controller are saved in order to change the performance characteristics of the drive motor in such a way that it is configured to deliver continuous steady power at the most constant possible rpm. In contrast to the emergency trip, the concern during the emergency is to maintain the emergency readiness for as long as possible and, especially during the emergency, to keep the emergency parameters constant. For example, an emergency aggregate may be formed by an extinguishing-agent pump, which needs a drive rpm that is as constant as possible, in order to supply extinguishing agent reliably at the extraction point or points. Pressure or volume fluctuations due to fluctuating extinguishing-agent extraction at an extraction point should be corrected reliably, so that the pressure conditions at other extraction points remain very largely uninfluenced by them. However, the emergency aggregate may also be formed by a turntable ladder, which is usually driven/operated hydraulically. Here it is of decisive importance that the hydraulic pump remains reliably in operation throughout the entire emergency and maintains a constant pressure in the hydraulic system.

During the emergency trip, the fully equipped and thus still heavy emergency vehicle is moving rapidly, and so irregularities in the road surfacing or sequential steering movements add up and may lead to an unstable driving behavior. According to a further development, therefore, it is provided that the suspension mechanism or the level-regulating system has kinematic sensors and actuators, wherein parameters of the level-regulating system are saved in the first suspension-control data set, so that a highly dynamic level-regulating characteristic is configured. In particular, the damping is adjusted to be very hard, which indeed is a burden on driving comfort but on the other hand may reduce bouncing and tilting movements. Outside the emergency trip, the emergency vehicles offer usually good spring comfort, since the underlying vehicle chassis are usually designed for comfortable driving over longer stretches.

A further development also consists in that a steering lock is detected by an angle sensor and evaluated by the level-regulating system for formation of the level-regulating characteristic. One advantage for the driving stability is also obtained when the level-regulating system is able to counter an impending slewing movement. Due to the large mass of the emergency vehicle and the associated time delay between steering movement and reaction of the mass, a hazardous rocking may occur as a consequence of steering movements, but this may be prevented by the subject embodiment.

For increase of the driving safety, especially during trips at high speed, it is of advantage when the emergency vehicle has a navigation system having a data output, via which data output characteristic values of the immediate driving route are communicated to the level-regulating system and evaluated by it for formation of the level-regulating characteristic. In this way the level-regulating system is able to realize an adaptation of the preliminary adjustment, so that any lateral tilting of the vehicle to be expected due to the next curve can already be compensated for in advance, for example in fact that the vehicle can already be inclined slightly in the direction of the inside of the curve upon entering the curve.

In particular, a proactive adaptation of the level-regulating system or of the level-regulating characteristic is intended to be achieved with the two foregoing further developments, in order to reduce an immediately impending inclination of the vehicle due to centrifugal forces. In particular, it is not provided that the inclination will be corrected, since this may lead to an unstable behavior if driver and level-regulating system execute corrections simultaneously. It is intended only that a preadjustment, for example of a suspension element, will take place. This preadjustment will be deactivated immediately after onset of the event, in order to restore the original vehicle dynamic.

On the basis of legal requirements, and for the safety of other road users, it is of advantage when parameters, whereby the signaling and illuminating device activates optical and acoustic signaling means, are saved in the first signaling data set. For example, it is possible or may be required that the flashing blue light, siren and/or high-beam headlights be activated during an emergency trip, in order to make other road users aware of the emergency vehicle.

On the emergency site, several actions are necessary with regard to the safeguarding of the vehicle and of the environment. It is therefore provided according to a further development that parameters, whereby the signaling and illuminating device activates illuminating means on the vehicle, are saved in the second signaling data set, in order to illuminate at least one region among the group comprising the immediate vehicle region, the accesses and exits of the vehicle, equipment shafts, or the emergency region close to the vehicle. At an unfamiliar emergency site, the hazard exists for the crew upon their exit from the vehicle that they may trip over hidden or poorly visible obstructions and be injured. Therefore it is of advantage when an adequate illumination of the surroundings of the vehicle is ensured as quickly as possible. Upon arrival at the emergency site, therefore, the driver is already able to initiate all steps for enabling an immediate and safe beginning of emergency operations.

Since an emergency site may also be located in a region where other road users are in transit, it is provided according to a further development that parameters, whereby the signaling and illuminating device activates signaling means for traffic control, are saved in the second signaling data set. For safeguarding of the vehicle itself, and for warning of other road users, it is of advantage when the driver, by selecting the second mode of operation, is already able to activate the appropriate warning devices shortly before the arrival at the emergency site.

In one embodiment of a fire truck, the drive motor is also used at the emergency site as the drive for an extinguishing system. It is therefore provided according to a further development that parameters of a controller of the extinguishing system, whereby actuating means are activated by this controller, whereby an extinguishing-agent pump of the emergency aggregate is coupled to the drive motor, are saved in the first emergency-aggregate data set.

In a further possible embodiment of the fire truck, an independent drive motor is provided as the drive of the emergency aggregate. Accordingly, a further development consists in that parameters of a controller of the extinguishing aggregate, whereby an aggregate drive motor is started by this controller, are saved in the first emergency-aggregate data set.

A further development also consists in that, in the second mode of operation, means are activated by the mode-of-operation controller in order to release the access to equipment shafts or emergency resources. Emergency equipment is usually disposed in equipment shafts that are secured against unauthorized access or an accidental opening. For this purpose, it may be provided that the rolling shutters, which close the equipment shafts, are automatically raised. It is precisely with protective gloves that the unlocking of rolling-shutter locks may be difficult in the hectic emergency situation, and thus lead to unnecessary stress. According to this further development, it may also be provided that extinguishing agents in an extinguishing-agent-transporting fire truck are already released at the emergency site, so that they are immediately ready in case of need. Thus the time until establishment of emergency readiness can again be shortened.

A further development also provides that, in the first or second mode of operation of the mode-of-operation controller, a synchronization data set is loaded and activated in a communication system of the emergency vehicle. On the way to or at the emergency site, it may occur that communications are to take place with emergency vehicles of other organizations. This often requires the adjustment of several communication means, which may greatly distract the driver. A potentially necessary search for saved communication parameters is also obviated by this further development.

A further development, according to which a local wireless communication network is established in the second mode of operation of the communication system, has the advantage that a communication network that is independent of the local circumstances is available to the emergency responders for voice, data and if necessary video communication.

Emergency responders may not be aware of the current situation on the spot for each emergency site, or usually too little time is available in preparation for this. Therefore it is of advantage when a data link to a public and/or a private emergency data network is established by the communication system, wherein the access authorizations are extracted from the synchronization data set. Thus the emergency responders are able to access plans and local monitoring devices, etc. and thus create a much more complete picture of the situation at the emergency site.

Preferably, the communication system is formed by an emergency management system present in the emergency vehicle or optionally available for the emergency vehicle. Such a system, for example EMEREC, as available from the Applicant, assists a bundling of emergency-relevant information and makes this information available centrally to a multiplicity of possible display means. For example, on a display means in the driver's cab, a smart phone or a tablet, which may be carried along by the emergency captain.

A further embodiment also consists in that, in the first and/or second suspension-control data set, null-position values of the suspension mechanism are saved that are transmitted from the memory means to the suspension mechanism upon selection of the first and/or second mode of operation. For achievement of a stable highway situation during an emergency trip at high speed, it is of advantage when the vehicle body is somewhat lowered, in order to lower the center of gravity among other adjustments and thereby to reduce potentially critical spring deflections. In the second mode of operation on the emergency site, it may be of advantage, for example, to lower the vehicle completely (removal of the entire spring deflection), in order to provide the emergency responders with easier reaching of the elements high on the vehicle. However, it may also be provided that a vehicle parking surface that is not horizontally aligned is compensated for on the emergency site by adaptation of the null position of the suspension mechanism and in this way an alignment of the emergency vehicle that is as horizontal as possible is ensured.

According to a further design, it is provided that the operating-data sets read out of the memory means are displayed on a display means of the operating-data controller and, prior to the transmission to the target systems, are individually adapted by the operator by way of an input means. The operating-data sets are configured in such a way that they are optimized for almost all application situations. However, since adaptation to all possible application situations is possible, it is provided according to this further development that the operator may adapt individual parameters manually. The preselected operating-data sets are displayed to the operator, for example on a flat screen, preferably in the viewing area, wherein the operator may then influence individual values selectively via selection fields.

A further development consists further in that the operating-data sets have a protected area, in which limit parameters are saved by the manufacturer. The advantage of the subject embodiment lies in that operating-data sets that were parameterized to ensure that the emergency vehicle was configured as well as possible for the respective mode of operation may be supplied by the manufacturer of the emergency vehicle. As well as possible, in the sense that the manufacturer is most familiar with the limit parameters of the emergency vehicle, and these parameters are to be complied with for reasons of the operating safety of the customer or operator. Individual adaptations by the customer or operator are naturally possible within the limit parameters.

A further development, according to which the operating-data sets have a protected area, in which emergency parameters are saved by the manufacturer, also tends in a similar direction. By means of emergency parameters, a basic emergency configuration can be defined. For example, operating-data sets for a municipal fire brigade are parameterized differently than for a rural fire brigade in a mountainous district. As a non-exclusive example, an all-wheel drive of a municipal fire brigade will be activated only if necessary, whereas in a fire department of a mountainous region this will be activated from the beginning of the emergency. A further advantage of this embodiment lies in that thereby a universal platform of a fire truck (the fully equipped vehicle) can be configured individually for a multiplicity of different emergency types and above all individually for customers. In particular, this is possible without having to make modifications to the vehicle. As a non-exclusive and non-limitative example, an operational fire brigade may be mentioned in which it is required, for reasons of operating safety, that each emergency vehicle, in each mode of operation, must maintain a communication link to a control center. For better understanding of the invention, it will be explained in more detail on the basis of the following figures.

Therein, respectively in greatly simplified schematic diagrams.

Figure 1:
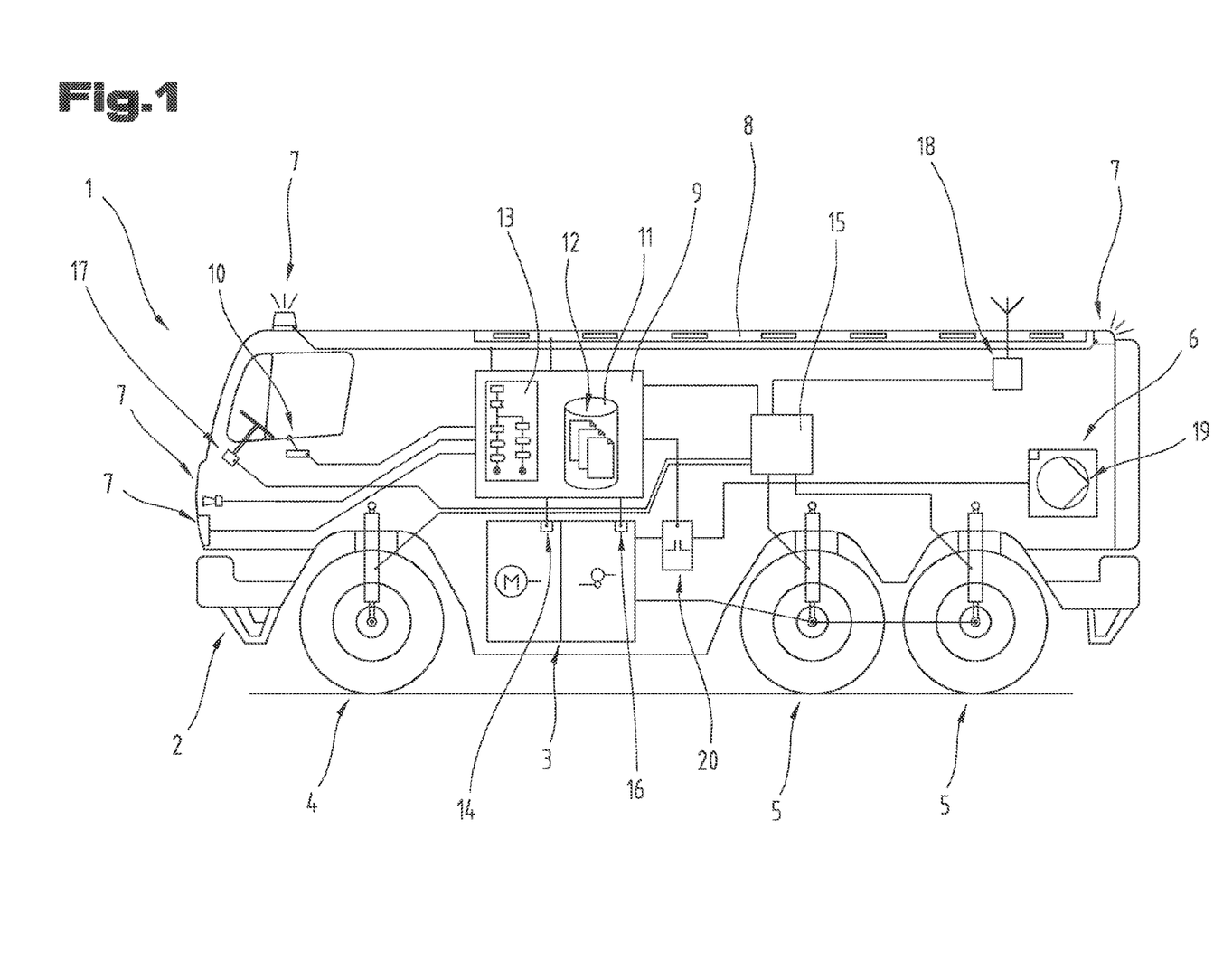
FIG. 1 shows an emergency vehicle in one possible embodiment as an extinguishing-agent-transporting fire truck, for implementation of the subject method.

FIG. 1 shows an emergency vehicle 1, which has a vehicle body 2, a drive unit 3, at least one front-wheel pair 4 and at least one rear-wheel pair 5. Furthermore, at least one emergency aggregate 6, a signaling device 7 and an illuminating device 8 are present. Furthermore, a mode-of-operation controller 9 is present, which has a mode-of-operation selector switch 10 and a memory means 11, wherein operating-data sets 12 are saved in the memory means 11. From the memory means 11, operating-data sets 12 corresponding to the mode of operation selected by the mode-of-operation selector switch 10 are read out by a sequence controller 13 of the mode-of-operation controller 9 and transmitted to an motor controller 14, to a level-regulating system 15 of the suspension mechanism, to the signaling device 7 and illuminating device 8, and to the emergency aggregate 6. Depending on selected mode of operation, some or all operating-data sets 12 mentioned in the foregoing may be transmitted. After transmission of the operating-data sets 12, these are activated by the mode-of-operation controller 9, so that the individual systems, especially the signaling device 7 and illuminating device 8, the level-regulating system 15, the gearbox controller 16, the emergency aggregate 6, especially a controller of an extinguishing system or of a hydraulic system, accept these operating data and from then on operate the respectively assigned systems in a manner corresponding to the communicated operating data or operating parameters.

According to a further embodiment, it is provided that a steering lock is detected by an angle sensor 17 and evaluated by the level-regulating system 15 for formation of the level-regulating characteristic. Likewise, according to a further embodiment, it is provided that a navigation system 18 is present, which communicates characteristic values of the immediate driving route via a data output to the level-regulating system 15, which are taken into consideration by this for the formation of the level-regulating characteristic.

In a first mode of operation, which corresponds to an emergency trip, it is of importance that the emergency vehicle 1 makes the emergency trip obvious to other highway users. In this regard, it is provided that the signaling device 7 is, for example, a warning light, especially a flashing blue light, which is noticed particularly well by other road users. However, the signaling device 7 may also be formed by a flashing light function of the vehicle lighting, in that the headlights of the vehicle lighting are switched cyclically between low beam and high beam. Likewise, it may be provided that the signaling device 7 is formed by a siren, which due to its loudness and frequency is distinguished clearly from the ambient noise. Upon arrival at the emergency site, i.e. in the second mode of operation, it is of importance that the immediate emergency site be illuminated by the emergency vehicle 1, so that a safe exit is provided for the crew traveling along in the emergency vehicle 1. It is therefore provided according to one embodiment that an illuminating device 8, which is provided with, for example, a multiplicity of individual lamps, is activated by the mode-of-operation controller 9.

It is likewise of advantage when, upon arrival at the emergency site, emergency-relevant components, such as, for example, the emergency aggregate 6, are already prepared for the emergency. According to one embodiment, it may be provided that the emergency aggregate 6 has an extinguishing-agent pump 19, which is coupled via clutch 20 to the drive unit 3. According to a further embodiment, not illustrated, it is also possible that the emergency aggregate 6 has its own drive unit, which in the second mode of operation is started on the basis of the parameters in the relevant operating-data set 12.

Figure 2:
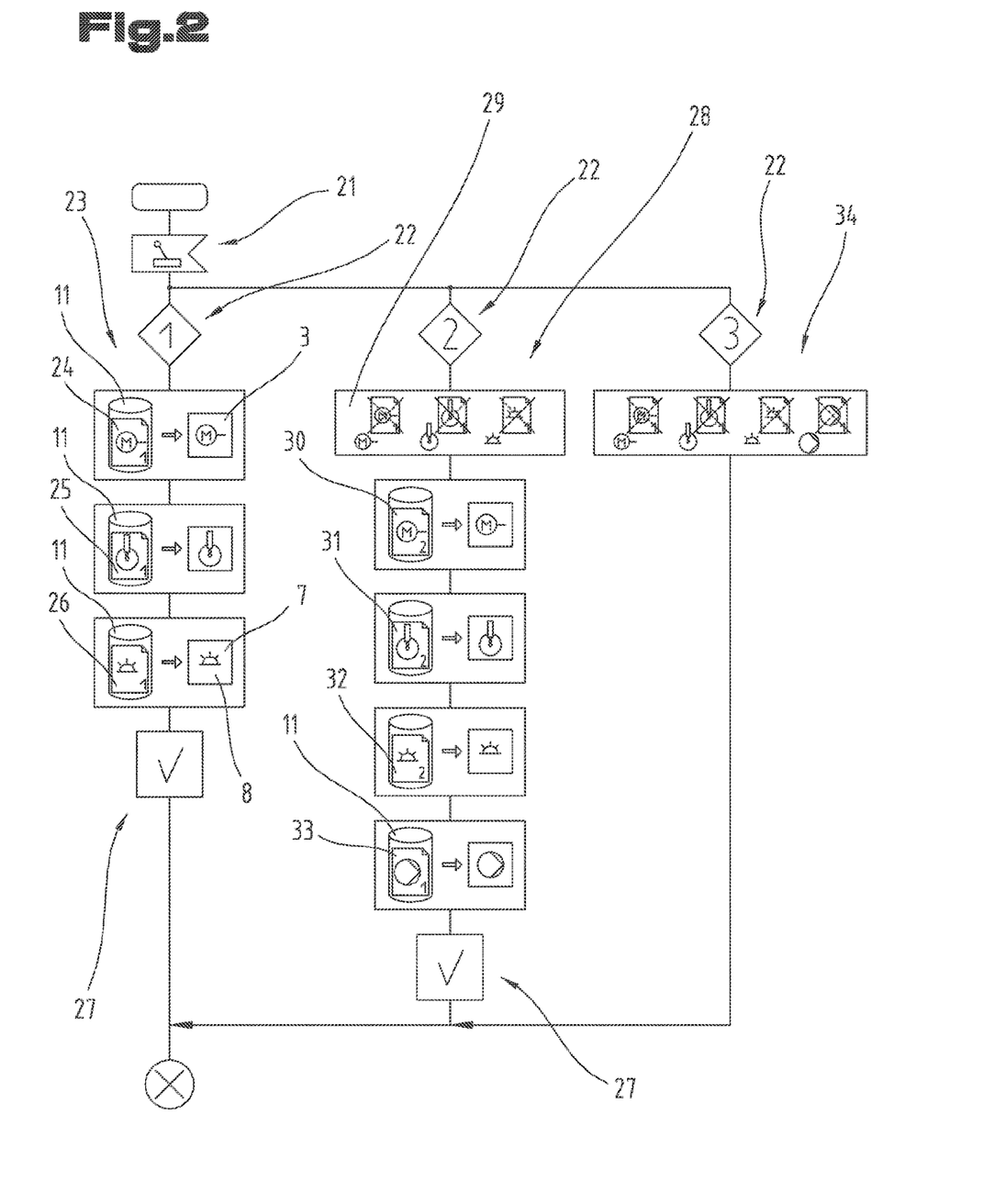
FIG. 2 shows a schematic flow diagram for illustration of the method steps that take place.

FIG. 2 shows a schematic flow diagram of the subject operating method. In a first step 21, the desired mode of operation is selected with the mode-of-operation selector switch. In a comparison step 22, it is determined by the mode-of-operation controller, especially the sequence controller, which mode of operation has been selected.

For selection of the first mode of operation 23, which corresponds to an emergency trip, a first motor-control data set 24 is read by the sequence controller of the mode-of-operation controller from the memory means 11 and transmitted to the drive unit 3, especially to the motor controller. Likewise, a first suspension-control data set 25 is read from the memory means and transmitted to the suspension mechanism or the level-regulating system 15. Likewise, a first signaling data set 26 is transmitted from the memory means 11 to the signaling device 7 or illuminating device 8.

After the operating-data sets have been transmitted, they are activated 27, whereby the individual control modules, for example the motor controller, the gearbox controller, etc. read the parameters from the operating-data sets and appropriately parameterize actuating elements, closed-loop control elements, open-loop control sets and the like.

If the second mode of operation 28 was selected in the first step 21, the transmitted operating-data sets of the first mode of operation are deactivated 29 first of all. The ensuing three steps correspond to those of the first mode of operation 23, wherein a second motor-control data set 30, a second suspension control data set 31 and a second signaling data set 32 are now transmitted from the memory means 11 to the corresponding control module.

Since the second mode of operation 23 corresponds to the emergency mode, a first emergency-aggregate data set 33 is also transmitted from the memory means 11 to the emergency aggregate 6. According to the embodiment illustrated in FIG. 1, the emergency aggregate 6 is formed by an extinguishing system having an extinguishing agent pump 19. It is also possible, for example, that the emergency aggregate is formed by a turntable ladder, which is usually operated hydraulically.

In the emergency situation, it may be necessary that the emergency zone is illuminated over a large area. Therefore the illuminating device 8 may comprise an extendable mast, which on the basis of the parameters in the second signaling data set 32 is extended and the illuminating means disposed thereon are activated.

After the operating-data sets 12 have been transmitted to the respective control units, these are activated 27 in a manner identical to that in the foregoing first mode of operation 23.

After the end of the emergency, the third mode of operation 34, in which the transmitted operating-data sets are deactivated, is selected by the emergency captain or driver of the emergency vehicle. Preferably, the third mode of operation 34 is selected after the end of the emergency situation, but it is also possible for the third mode of operation 34 to be selected directly from the first mode of operation 23, for example if an emergency operation is no longer necessary.

What is not illustrated in FIG. 2 is the possibility that the preselected operating-data sets are displayed on a display means of the mode-of-operation controller and are individually adapted by the operator by means of an input device.

The particular advantage of the subject operating method now lies in that a large number of configuration tasks to be performed is taken from the driver of an emergency vehicle or from an emergency captain traveling along and performed in automated manner in the correct sequence. In particular, these tasks are executed without additional necessary interaction, and so the emergency driver or the emergency captain is able to prepare for the impending emergency fully and completely. However, a manual override of the automatic mode is likewise provided. Furthermore, it is ensured with the subject operating method that configuration adjustments are made completely and in the correct sequence even in the hectic situation of an emergency. With the subject operating method, a significant relief of the burden on the emergency responders is achieved, thus in particular significantly reducing the risk of endangerment of themselves and others.

Finally, it is pointed out that like parts in the differently described embodiments are denoted with like reference symbols or like structural-part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

LIST OF REFERENCE NUMERALS

1 Emergency vehicle
2 Vehicle body
3 Drive unit
4 Front-wheel pair
5 Rear-wheel pair
6 Emergency aggregate
7 Signaling device
8 Illuminating device
9 Mode-of-operation controller
10 Mode-of operation selector switch
11 Memory means
12 Operating-data sets
13 Sequence controller
14 Motor controller
15 Level-regulating system
16 Gearbox controller
17 Angle sensor
18 Navigation system
19 Pump
20 Clutch
21 First step
22 Comparison step
23 First mode of operation
24 First motor-control data set
25 First suspension-control data set
26 First signaling data set
27 Activation
28 Second mode of operation
29 Deactivation
30 Second motor-control data set
31 Second suspension-control data set
32 Second signaling data set
33 First emergency-aggregate data set
34 Third mode of operation

The invention claimed is:

1. An operating method for an emergency vehicle, which emergency vehicle is provided with
a vehicle body,
a drive unit, having at least one drive motor and one motor controller,
at least one front-wheel pair and at least one rear-wheel pair,
at least one emergency aggregate,
and a signaling device and an illuminating device, wherein
the front-wheel pair and the rear-wheel pair are respectively joined via a suspension mechanism having a level-regulating system to the vehicle body,
and wherein at least the rear-wheel pair is in communication with the drive motor,
and wherein the emergency aggregate is in communication with the drive motor, or
has an aggregate drive motor,
comprising,
furthermore, a mode-of-operation controller, which has a mode-of-operation selector switch having several manually selectable modes of operation, each of the modes of operation being assigned to a position of the selector switch and a memory
having operating-data sets saved therein,
wherein
by a sequence controller of the operating-data controller
upon selection of a first mode of operation by switching the selector switch into a first position, which corresponds to an emergency trip,
a first motor-control data set is transmitted from the memory to the motor controller, and
a first suspension-control data set is transmitted from the memory to the suspension mechanism, and
a first signaling data set is transmitted from the memory to the signaling device and the illuminating device, and
the transmitted data sets are activated;
wherein the first motor-control data set, the first suspension-control data set and the first signaling data set are assigned to the first position of the selector switch;
and wherein
upon selection of a second mode of operation by switching the selector switch into a second position, which corresponds to an emergency mode, the transmitted data sets of the first mode of operation are deactivated and a second motor-control data set is transmitted from the memory to the motor controller, and
a second suspension-control data set is transmitted from the memory to the suspension mechanism, and
a second signaling data set is transmitted from the memory to the signaling device and the illuminating device, and
a first emergency-aggregate data set is transmitted to the emergency aggregate, and the transmitted data sets are activated;
wherein the second motor-control data set, the second suspension-control data set, the second signaling data set and the first emergency-aggregate data set are assigned to the second position of the selector switch;
and wherein
upon selection of a third mode of operation by switching the selector switch into a third position, which corresponds to a standard mode of operation, the transmitted data sets of the first, second or if applicable further mode of operation are deactivated;
wherein the first signaling data set corresponds to a first condition of the signaling device and the illuminating device which activates first optical and acoustic signals when the selector switch is switched into the first position and the second signaling data set corresponds to a second condition of the signaling device and the illuminating device which activates second optical and acoustic signals when the selector switch is switched into the second position.

2. The operating method according to claim 1, wherein the rear-wheel pair is in communication with the drive motor via a gearbox, wherein, in the first mode of operation, a first gearbox-control data set is transmitted from the memory to a gearbox controller.

3. The operating method according to claim 1, wherein, in the first motor-control data set, parameters of the motor controller are saved in order to change the performance characteristics of the drive motor in such a way that it is configured to deliver maximum peak power.

4. The operating method according to claim 1, wherein, in the second motor-control data set, parameters of the motor controller are saved in order to change the performance characteristics of the drive motor in such a way that it is configured to deliver continuous steady power at the most constant possible rpm.

5. The operating method according to claim 1, wherein the suspension mechanism or the level-regulating system has kinematic sensors and actuators, wherein parameters of the level-regulating system are saved in the first suspension-control data set, so that a highly dynamic level-regulating characteristic is configured.

6. The operating method according to claim 5, wherein a steering lock is detected by an angle sensor and evaluated by the level-regulating system for formation of the level-regulating characteristic.

7. The operating method according to claim 5, wherein the emergency vehicle has a navigation system having a data output, via which data output characteristic values of the immediate driving route are communicated to the level-regulating system and evaluated by it for formation of the level-regulating characteristic.

8. The operating method according to claim 1, wherein parameters, whereby the signaling device and the illuminating device activate an optical signaling device and an acoustic signaling device, are saved in the first signaling data set.

9. The operating method according to claim 1, wherein parameters, whereby the signaling device and the illuminating device activate lamps, are saved in the second signaling data set, in order to illuminate at least one region from the group comprising the immediate vehicle region, the accesses and exits of the vehicle, equipment shafts, or the emergency region close to the vehicle.

10. The operating method according to claim 1, wherein parameters, whereby the signaling device and the illuminating device activate signaling indicators for traffic control, are saved in the second signaling data set.

11. The operating method according to claim 4, wherein parameters of a controller of the emergency aggregate, whereby an actuator is activated by this controller, whereby an extinguishing-agent pump of the emergency aggregate is coupled to the drive motor, are saved in the first emergency-aggregate data set.

12. The operating method according to claim 1, wherein parameters of a controller of the emergency aggregate, whereby an aggregate drive motor is started by this controller, are saved in the first emergency-aggregate data set.

13. The operating method according to claim 1, wherein, in the second mode of operation, the mode-of-operation controller releases access to equipment shafts or emergency resources.

14. The operating method according to claim 1, wherein, in the first mode of operation or the second mode of operation, a synchronization data set is loaded and activated by the mode-of-operation controller in a communication system of the emergency vehicle.

15. The operating method according to claim 14, wherein a local wireless communication network is established in the second mode of operation of the communication system.

16. The operating method according to claim 14, wherein a data link to a public and/or a private emergency data network is established by the communication system, wherein the access authorizations are extracted from the synchronization data set.

17. The operating method according to claim 1, wherein, in the first and/or second suspension-control data set, null-position values of the suspension mechanism are saved that are transmitted from the memory to the suspension mechanism upon selection of the first mode of operation and/or the second mode of operation.

18. The operating method according to claim 1, wherein the operating-data sets read out of the memory are displayed on a display of the operating-data controller and, prior to the transmission to the target systems, are individually adapted by the operator by way of an input device.

19. The operating method according to claim 1, wherein the operating-data sets have a protected area, in which limit parameters are saved by the manufacturer.

20. The operating method according to claim 1, wherein the operating-data sets have a protected area, in which emergency parameters are saved by the manufacturer.

21. An operating method for an emergency vehicle, which emergency vehicle is provided with
a vehicle body,
a drive unit, having at least one drive motor and one motor controller,
at least one front-wheel pair and at least one rear-wheel pair,
at least one emergency aggregate,
and a signaling device and an illuminating device,
wherein
the front-wheel pair and the rear-wheel pair are respectively joined via a suspension mechanism having a level-regulating system to the vehicle body,
and wherein at least the rear-wheel pair is in communication with the drive motor,
and wherein the emergency aggregate is in communication with the drive motor, or has an aggregate drive motor,
comprising,
furthermore, a mode-of-operation controller, which has a mode-of-operation selector switch having several manually selectable modes of operation, each of the modes of operation being assigned to a position of the selector switch and a memory having operating-data sets saved therein,
wherein
by a sequence controller of the operating-data controller
upon selection of a first mode of operation by switching the selector switch into a first position, which corresponds to an emergency trip,
a first motor-control data set is transmitted from the memory to the motor controller, and
a first suspension-control data set is transmitted from the memory to the suspension mechanism, and
a first signaling data set is transmitted from the memory to the signaling device and the illuminating device, and
the transmitted data sets are activated;
wherein the first motor-control data set, the first suspension-control data set and the first signaling data set are assigned to the first position of the selector switch;

and wherein upon selection of a second mode of operation by switching the selector switch into a second position, which corresponds to an emergency mode, the transmitted data sets of the first mode of operation are deactivated and a second motor-control data set is transmitted from the memory to the motor controller, and a second suspension-control data set is transmitted from the memory to the suspension mechanism, and a second signaling data set is transmitted from the memory to the signaling device and the illuminating device, and a first emergency-aggregate data set is transmitted to the emergency aggregate, and the transmitted data sets are activated;

wherein the second motor-control data set, the second suspension-control data set, the second signaling data set and the first emergency-aggregate data set are assigned to the second position of the selector switch;

and wherein upon selection of a third mode of operation by switching the selector switch into a third position, which corresponds to a standard mode of operation, the transmitted data sets of the first, second or if applicable further mode of operation are deactivated wherein the second signaling data set is associated with the first emergency-aggregate data set.

\* \* \* \* \*